United States Patent
Franke et al.

(10) Patent No.: US 10,605,625 B2
(45) Date of Patent: Mar. 31, 2020

(54) MEASURING SYSTEM

(71) Applicant: TDK—Micronas GmbH, Freiburg (DE)

(72) Inventors: Joerg Franke, Freiburg (DE); Timo Kaufmann, Waldkirch-Suggental (DE)

(73) Assignee: TDK-Micronas GmbH, Freiburg (DE)

( * ) Notice: Subject to any disclaimer, the term of this patent is extended or adjusted under 35 U.S.C. 154(b) by 0 days.

(21) Appl. No.: 15/664,691

(22) Filed: Jul. 31, 2017

(65) Prior Publication Data

US 2018/0031391 A1 Feb. 1, 2018

(30) Foreign Application Priority Data

Jul. 29, 2016 (DE) .......................... 10 2016 009 166

(51) Int. Cl.
*G01D 5/14* (2006.01)

(52) U.S. Cl.
CPC ............. *G01D 5/145* (2013.01); *G01D 5/147* (2013.01)

(58) Field of Classification Search
CPC ........ G01D 5/145; G01D 5/147; G01D 5/142; G01D 5/12; G01D 5/14; G01D 1/00; G01D 21/00; G01D 5/165; G01D 11/245; G01D 3/0365; G01D 5/2013; G01R 33/07; G01R 33/072; G01R 33/0047; G01R 33/02; G01R 33/095; G01R 33/0094; G01R 33/1215; G01R 33/038; G01B 7/30; G01B 7/14; G01B 7/023; G01B 7/00; G01B 7/003; G01K 13/08; G01N 25/72; G01N 27/72; G01V 3/08

See application file for complete search history.

(56) References Cited

U.S. PATENT DOCUMENTS

| | | | |
|---|---|---|---|
| 5,508,611 A * | 4/1996 | Schroeder | F02P 7/07 174/545 |
| 5,963,028 A | 10/1999 | Engel et al. | |
| 7,250,760 B2 | 7/2007 | Denichi | |
| 8,860,847 B2 | 3/2014 | Franke et al. | |
| 9,645,203 B2 | 5/2017 | Kaufmann et al. | |

(Continued)

FOREIGN PATENT DOCUMENTS

| | | |
|---|---|---|
| DE | 10 2004 010 126 A1 | 9/2004 |
| DE | 698 27 559 T2 | 12/2005 |

(Continued)

*Primary Examiner* — Vinh P Nguyen
(74) *Attorney, Agent, or Firm* — Muncy, Geissler, Olds & Lowe, P.C.

(57) ABSTRACT

A measuring system for determining the position of a transducer along a z-direction, having a semiconductor body having a surface, a back surface, at least one connection contact and at least one magnetic field sensor which is sensitive in the z-direction, a carrier having a front side, rear side and electrically conductive regions, a magnet for producing a magnetic field, having a first magnetic pole formed along a first surface and an axis of symmetry extending perpendicular to the first surface, wherein between at least one connection contact of the semiconductor body and at least one conductor track of the carrier, there is an electrical operative connection, the first surface of the magnet being arranged parallel to the z-direction and the axis of symmetry of the magnet being arranged perpendicular to the z-direction, the transducer having an end face facing the magnetic field sensor.

12 Claims, 2 Drawing Sheets

(56) References Cited

U.S. PATENT DOCUMENTS

| | | |
|---|---|---|
| 9,647,144 B2 | 5/2017 | Heberle |
| 2006/0261801 A1 | 11/2006 | Busch |
| 2009/0140725 A1 | 6/2009 | Ausserlechner |
| 2013/0154618 A1* | 6/2013 | Heberle ................... G01B 7/00 324/207.2 |

FOREIGN PATENT DOCUMENTS

| | | |
|---|---|---|
| DE | 10 2011 121 298 A1 | 6/2013 |
| DE | 10 2014 011 245 B3 | 6/2015 |
| WO | WO 2010/060607 A2 | 6/2010 |

\* cited by examiner

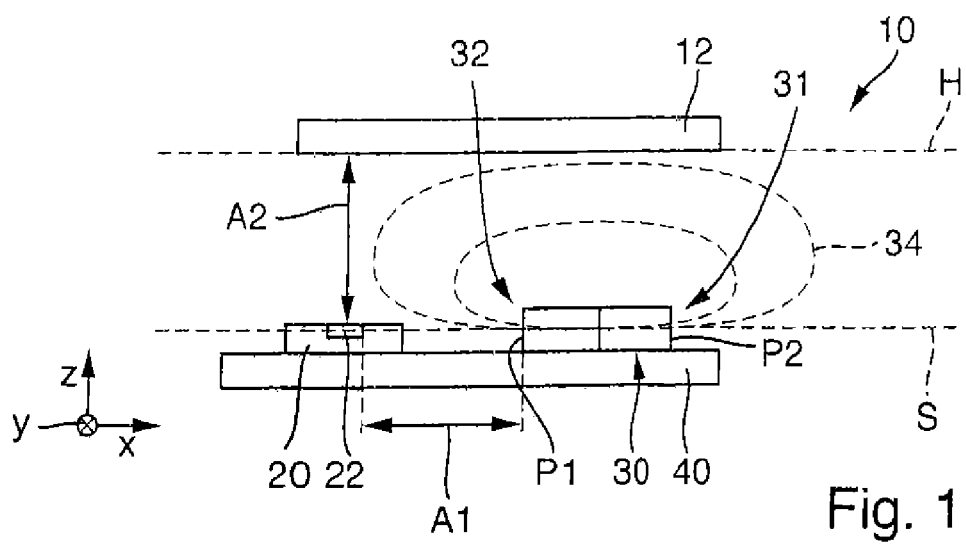
Fig. 1
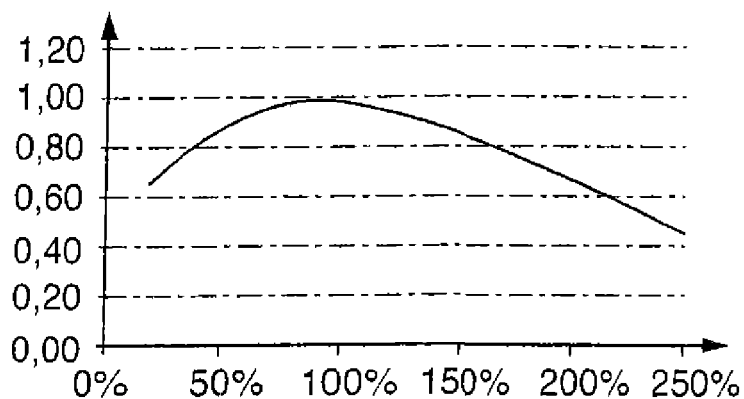
Fig. 2
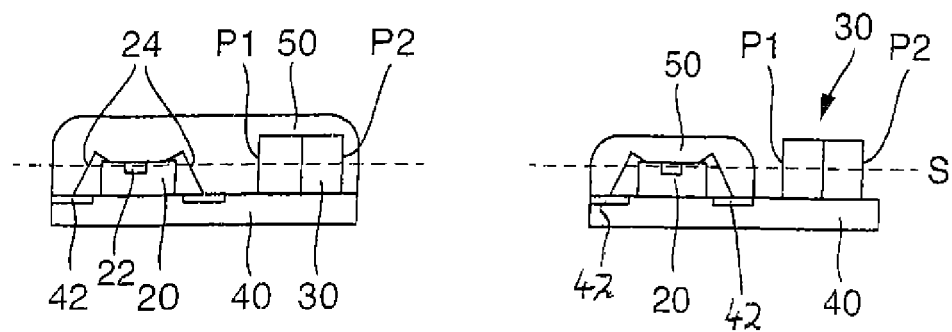
Fig. 3
Fig. 4

MEASURING SYSTEM

This nonprovisional application claims priority under 35 U.S.C. § 119(a) to German Patent Application No. 10 2016 009 166.5, which was filed in Germany on Jul. 29, 2016, and which is herein incorporated by reference.

BACKGROUND OF THE INVENTION

Field of the Invention

The invention relates to a measuring system for determining a position of a transducer along a z-direction.

Description of the Background Art

An IC package with a semiconductor chip with an integrated circuit and an integrated magnetic sensor is known from WO 2010/060607 A2. Spaced apart from the housing of the semiconductor chip is a permanent magnet of which the magnetic flux penetrates the sensor. If an object to be measured approaches the end of the semiconductor chip at the head end, the magnetic flux density changes through the sensor. It is desirable to improve the complex arrangement and the sensitivity thereof.

From DE 10 2004 010 126 A1 and U.S. Pat. No. 7,250,760 B2, integrated magnetic Hall sensors are known in which in each case a permanent magnet is arranged with the sensor in the IC package. In this case, the Hall sensors are arranged relative to the field of the permanent magnets in such a way that a Hall voltage is generated without external field influence.

An integrated Hall effect sensor unit is known from DE 698 27 559 T2, which corresponds to U.S. Pat. No. 5,963,028, in which a Hall sensor is arranged above and a permanent magnet is arranged below a metallic carrier, which is also referred to as a leadframe. The individual components are arranged in a single IC package. The permanent magnet is arranged within the IC package such that the magnetic field generated by the permanent magnet is perpendicular to the integrated Hall sensor. In other terms, the magnetic field lines extend substantially perpendicular to a main extension plane of the Hall sensor and produce a Hall voltage without external field influence. In an arrangement of a ferromagnetic component formed outside the IC package directly above the main extension direction of the Hall sensor, in comparison, without the ferromagnetic component, the reluctance is reduced and the Hall voltage is increased.

Integrated Hall effect sensor units with a permanent magnet positioned on the sensor unit are also known from US 2006/0261801 A1 as well as from DE 10 2011 121 298 A1 and DE 10 2014 011 245 B3, which corresponds to U.S. Pat. No. 9,645,203, which is incorporated herein by reference.

In particular, DE 10 2011 121 298 A1, which corresponds to U.S. Pat. No. 9,647,144, which is incorporated herein by reference, and which teaches to form the smallest possible distance between the magnet and the sensor in order to achieve a particularly high magnetic flux density in the region of the sensor and thus a particularly high sensitivity of the measurement.

DE 10 2011 121 298 A1, which also teaches to carry out a calibration in order to increase the accuracy. By means of the calibration and especially high flux density in the region of the sensor, it is possible according to DE 10 2011 121 298 A1 to detect the transducer already at a great distance from the sensor "i.e., at a particularly small approximation". Thus, DE 10 2011 121 298 A1 has the object of allowing the largest possible distance to the transducer.

In DE 10 2014 011 245 B3, a differential measurement is carried out by means of two sensors.

US 2009/0140725 discloses an integrated Hall effect sensor which comprises a sensor which is at least partially surrounded by an injection-molded magnetic material.

SUMMARY OF THE INVENTION

It is therefore an object of the invention to provide a device which develops the state of the art.

According to an exemplary embodiment of the invention, a measuring system is provided for determining a position of a transducer along a z-direction.

The measuring system comprises a semiconductor body with at least one magnetic field sensor, a carrier and a magnet for producing a magnetic field. The carrier has a front side, a rear side.

The semiconductor body has a surface, a back surface and at least two connection contacts, wherein the at least one magnetic field sensor is arranged on the surface of the semiconductor body and is sensitive in the z-direction.

The carrier comprises a plurality of electrically conductive regions on the front side or on the rear side, or the carrier is formed of a plurality of electrically conductive regions.

The magnet has for producing a magnetic field having a first magnetic pole formed along a first surface and an axis of symmetry perpendicular to the first surface, the first magnetic pole being formed in a y-z plane and a second magnetic pole being spaced apart from the first magnetic pole in an x-direction, and the axis of symmetry traversing the first surface.

The axis of symmetry is formed in the x-direction.

An electrical operative connection exists between two connection contacts of the semiconductor body and at least one conductor track of the carrier. The first surface of the magnet is arranged parallel to the z-direction, and the axis of symmetry of the magnet is arranged perpendicular to the z-direction.

The transducer has a first end face facing the magnetic field sensor, the end face of the transducer being movable parallel to the z-direction at least up to a measuring height in the direction of the magnetic field sensor.

The magnetic field sensor has a first distance to the first surface of the magnet in the direction of the axis of symmetry and a second distance to the measuring height, the first distance being between 60% and 110% of the second distance.

In addition to the semiconductor body with the magnetic field sensor, the carrier also accommodates the magnet, the magnet being arranged at least partially above the carrier. Preferably, the magnet is arranged on the carrier.

The axis of symmetry penetrates the pole face of the magnet and the magnetic field sensor, in particular the axis of symmetry penetrates the pole face of the magnet in the surface center of gravity.

The magnet has a polarity change in one direction of the Y axis. The two pole faces of the magnet are preferably parallel to each other.

An advantage of the device according to the invention is that the sensitivity of the integrated magnetic field sensor is changed by the combination of a semiconductor body, also called a die, with a permanent magnet on a common carrier, and by the parallel course of the magnetic field lines to the main extension plane of the magnetic field sensor.

It is understood that the wording "magnetic field sensor can be formed on the semiconductor surface" includes a magnetic field sensor, wherein during the processing of the semiconductor body, the magnetic field sensor is arranged in the semiconductor body near the surface. Such a semiconductor sensor is also referred to as a monolithically integrated semiconductor sensor. Preferably, the magnetic field sensor is designed as a Hall sensor, in particular as a Hall plate.

It should also be noted that an evaluation circuit cab also be integrated on the semiconductor body, and that the evaluation circuit is in an electrical operative connection with the magnetic field sensor.

The magnetic field sensor can be arranged such that the magnetic flux is detected and measured in the z-direction by means of the magnetic field sensor. Preferably, the magnetic field sensor can be used to detect only the magnetic flux in the z-direction.

It should be noted that the magnetic field sensor has an electrical operative connection to the semiconductor body.

In an embodiment, the magnetic field sensor or the magnetic field sensors can be arranged on the surface, preferably directly on the surface.

If a plurality of magnetic field sensors is present, a mixed arrangement, i.e., a formation of a semiconductor sensor in the semiconductor body and of another semiconductor sensor on the surface of the semiconductor body, is also advantageous.

It should be noted that in an embodiment, the carrier can also be designed as a leadframe, i.e., the electrically conductive regions are formed by the leadframe.

Alternatively, the electrically conductive regions are designed as conductor tracks on a circuit board, i.e., the carrier is designed as a circuit board. In this case, the conductor tracks are formed on the front side of the carrier or the circuit board.

The carrier comprises a plurality of electrical regions or is formed of the regions.

One reason for this is that by means of the very small distance between magnetic field sensor and, in particular, the Hall sensor and permanent magnet, and due to the spatial advantageous alignment of the main extension plane of the Hall sensor to the permanent magnet, a Hall voltage is preferably produced only, and preferably only when, a ferromagnetic component, i.e., a transducer, which is arranged nearby and outside of the housing, changes the flux density in the Hall sensor. In other words, the magnetic field sensor is arranged such that in the absence of the transducer, the magnetic flux in the z-direction is very small, i.e., not measurable or preferably zero, and that in the absence of the transducer, the magnetic field sensor with respect to the magnetic flux in the z-direction is arranged in the zero magnetic field.

Via the inventive tuning of the distance between magnet and magnetic field sensor to the measuring height, a maximum measuring signal is achieved with the magnetic field sensor.

Distances between magnet and magnetic field sensor that are too small surprisingly lead to a reduction of the measuring signal, although the gradient of the magnetic field increases. In other words, the distance range of the transducer for the production of a particularly high magnetic flux in the z-direction is influenced in particular by the distance between the magnetic field sensor and the magnet.

If the transducer is absent, the magnetic flux through the magnetic field sensor is not measurable or is zero so that the measuring signal is in the range of the noise, or is approximately zero or not measurable. If a measuring signal is present in the absence of the transducer, incorrect positioning of the magnetic field sensor with respect to the semiconductor sensor can be concluded.

Although the gradient of the magnetic field in the region of the sensor is reduced by too great a distance between the magnet and the magnetic field sensor, the achievable measuring signal also reduces.

In an embodiment, the first distance can be between 70% and 100% of the second distance, whereby a particularly strong measurement signal is obtained.

In an embodiment, the magnet can be designed cubically or cylindrically.

According to an embodiment, the semiconductor body can be arranged with the magnetic field sensor and the magnet on the front side of the carrier. The magnet is arranged at least partially above the carrier. Preferably, the magnetic field sensor is completely enclosed by encapsulating material.

In an embodiment, the semiconductor body with the magnetic field sensor can be configured as a packaged IC or as a wired, packaged IC.

According to an embodiment, the front side of the carrier can be designed either as a planar surface, the semiconductor with the magnetic field sensor and the magnet being arranged adjacent to one another on the front side, or the front side of the carrier having at least one recess, the magnet being arranged in the recess.

In an embodiment, the magnetic field sensor can be designed as a lateral Hall plate and has a main extension plane, the main extension plane being parallel to the axis of symmetry of the magnet.

In an embodiment, the magnetic field sensor can be designed as a vertical Hall plate and has a main extension plane, the main extension plane being formed parallel to the x-y plane.

In an embodiment, the axis of symmetry penetrates the magnetic field sensor and penetrates the first pole face of the magnet in the center of gravity of the surface. As a result, without the sensor, the magnetic field sensor does not see any magnetic flux at least in the z-direction.

In an embodiment, the second pole face can be spaced apart from the first pole face in the x-direction, the two pole faces preferably being parallel to each other.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 is a schematic view of an embodiment of a measurement system according to the invention, FIG. 2 is a dependency of a measured signal strength of a ratio of a first distance to a second distance, FIG. 3 is a view of an exemplary embodiment of the measurement system according to the invention, FIG. 4 is a view of an exemplary embodiment of the measurement system according to the invention.

DETAILED DESCRIPTION

Figure 5:
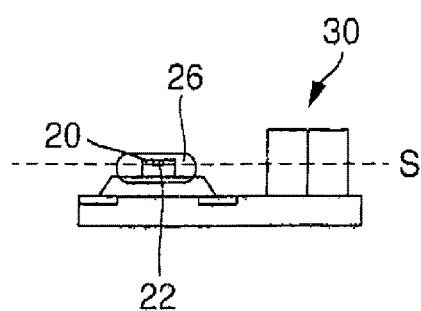
FIG. 5 is a view of an exemplary embodiment of the measurement system according to the invention.

FIG. 1 shows a cross-sectional view of a first embodiment of a measuring system 10 comprising a semiconductor body 20 with a magnetic field sensor 22 which is sensitive in the z-direction, a magnet 30 for producing a magnetic field 34, and a carrier 40 having a front side and a rear side, the semiconductor body 20 and the magnet 30 being arranged on the front side of the carrier. For the sake of clarity, the mutually perpendicular spatial directions x, y and z are depicted as a Cartesian coordinate system. In the present case, the magnetic field sensor 22 is designed as a Hall plate in the x-y plane.

The measuring system 10 supplies a measuring signal by means of the magnetic field sensor 22 which becomes larger when an end surface of a transducer 12 facing the magnetic field sensor 22 approaches the magnetic field sensor 22 along the z-direction as far as a measuring height H.

The semiconductor body 20 has a surface and a back surface, the semiconductor body 20 in the illustrated embodiment resting on the carrier 40 with the rear surface and the magnetic field sensor 22 being arranged on the surface with a main extension plane, running parallel to the surface of the semiconductor body 20.

The magnet 30 has a first magnetic pole P1 formed along a first surface 32, wherein the first surface 32 is perpendicular to an axis of symmetry S of the magnet 30 so that components of the magnetic field 34 extending perpendicular to the axis of symmetry S of the magnet 30, away from the first surface 32, completely disappear along the axis of symmetry S or are zero. The first surface 32 is formed in the y-z plane. The symmetry axis S runs in the x-direction and penetrates the first surface 32. Preferably, the axis of symmetry S penetrates the first surface 32 in the center of gravity of the first surface 32.

The magnet 30 has a second magnetic pole P2 formed along a second surface 33, the second surface 33 being perpendicular to an axis of symmetry S of the magnet 30 and formed parallel to the first surface 32. The two surfaces 32 and 33 are spaced apart from one another in the x-direction. In the present case, the first pole P1 is designed as a south pole and the second pole is designed as a north pole.

The magnet 30 is arranged next to the semiconductor body 20 on the carrier 40, the axis of symmetry S being oriented perpendicular to the z-direction and parallel to the main extension plane of the magnetic field sensor 22. As a result, the magnetic field sensor 22 is located in the region of the symmetry axis S of the magnet 30 and thus in a region of the magnetic field 34 with a component Bz=0.

The strength of a measurement signal measured with the magnetic field sensor 22 depends essentially on a first distance A1 between the magnetic field sensor 22 and a second distance A2 between the magnetic field sensor 22 and the measuring height H, or on a ratio of the first distance A1 from the second distance A2.

As can be seen from the graph shown in FIG. 2, a particularly high signal strength is achieved when the first distance is between 70% and 100% of the second distance. The graph of FIG. 2 shows a measurement signal of the magnetic field sensor 22 (vertical coordinate axis) normalized to a maximum measured value above the first distance A1, between magnet 30 and magnetic field sensor 22 (vertical coordinate axis), normalized to the second distance A2.

FIGS. 3 to 11 show further advantageous embodiments of the measuring system 10. In the following, only the differences to the illustration of FIG. 1 or to the previous illustrations are explained in each case.

The measuring system 10 shown in FIG. 3 has a carrier 40 formed of a non-electrically conductive material with conductor tracks 42 arranged on the front side. The semiconductor body 20 has connection contacts 24, each connection contact 24 being electrically conductively connected to an electrically conductive region 42 of the measuring system 10, which is in the form of conductor tracks. The magnet 30 and the semiconductor body 20 with the magnetic field sensor 22 and the connection contacts 24 are completely enclosed by an encapsulating material 50 for protection against environmental influences.

It is likewise possible to encapsulate only the semiconductor body 20 with the encapsulating material 50, as shown in FIG. 4.

Figure 6:
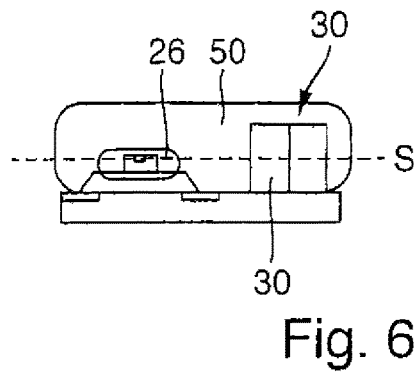
FIG. 6 is a view of an exemplary embodiment of the measurement system according to the invention.

FIGS. 5 and 6 each show measuring systems 10 with a packaged IC chip 26 comprising the semiconductor body 20 with the magnetic field sensor 22, the packaged IC chip 26 of the measuring system 10 of FIG. 6 additionally being completely enclosed by an encapsulating material 50 together with the magnet 30.

Figure 7:
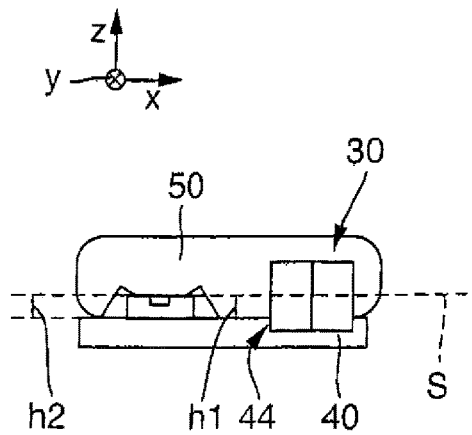
FIG. 7 is a view of an exemplary embodiment of the measurement system according to the invention.
Figure 8:
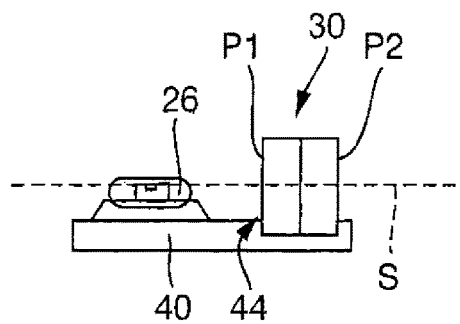
FIG. 8 is a view of an exemplary embodiment of the measurement system according to the invention.

Depending on the size of the magnet 30, it may be advantageous to provide a recess 44 for the magnet 30 in the front side of the carrier 40 or to arrange the magnet in a recess 44 in the front side of the carrier 40 so that a first height h1 of the axis of symmetry S of the magnet 30 above the front side of the carrier 40 coincides with a second height h2 of the magnetic field sensor 22 above the front side of the carrier 40. FIG. 7 shows such an arrangement for a measuring system with an encapsulated semiconductor body 20 with magnetic field sensor 22 and magnets 30. FIG. 8 shows a magnet 30 of a measuring system 10 with a packaged IC chip 26 which is arranged in the recess 42 of the carrier 40.

Figure 9:
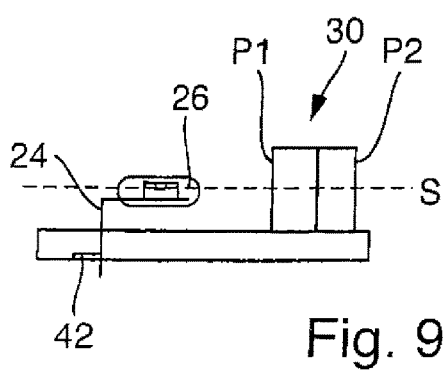
FIG. 9 is a view of an exemplary embodiment of the measurement system according to the invention.

A packaged IC chip 26 comprising the semiconductor body 20 with the magnetic field sensor 22 is electrically conductively connected according to the embodiment shown in FIG. 9 by means of a connection contact 24, which is designed as a wire connection and is guided through a hole in the carrier 40, with a conductor track running at the rear or front side of the carrier.

Figure 10:
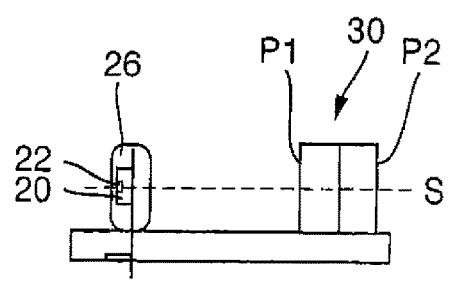
FIG. 10 is a view of an exemplary embodiment of the measurement system according to the invention.

FIG. 10 shows a further embodiment of the measuring system 10, wherein the IC chip 26 with the semiconductor body 20 and the magnetic field sensor 22 is arranged in such a way that the main extension plane of the magnetic field sensor 22 runs perpendicular to the axis of symmetry S of the magnet 30. In the present case, the magnetic field sensor 22 is designed as a vertical Hall sensor on the surface of the semiconductor body. The vertical Hall sensor, which is designed in relation to the plane of the die, i.e. the surface of the semiconductor body, is exclusively sensitive to a magnetic flux in the direction of the x or y direction.

Figure 11:
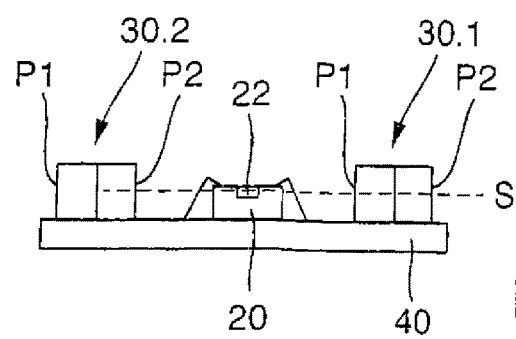
FIG. 11 is a view of an exemplary embodiment of the measurement system according to the invention.

FIG. 11 shows a further embodiment of the measuring system 10, the semiconductor body 20 being arranged on the carrier 40 between the first magnet 30.1 with the first pole surface P1 and a second magnet 30.2 with the second pole surface P2.

The symmetry axis S penetrates the two pole faces P1, P2 of the two magnets 30.1 and 30.2, preferably at the respective center of gravity, and also penetrates the magnetic field sensor 22, which is designed as a Hall sensor.

An advantage of the arrangement between two magnets 30.1 and 30.2 is that, as the transducer 12 approaches, a magnetic flux increases in the z-direction as compared to the arrangement with a single magnet 30.

Overall, the sensitivity of the measuring system 10 is increased by the arrangement with two magnets 30.1 and 30.2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A measuring system for determining a position of a transducer along a z-direction, the measuring system comprising:
    a semiconductor body having a surface, a back surface, at least two connection contacts and at least one magnetic field sensor, which is arranged on the surface and sensitive in the z-direction;
    a carrier with a front side and a rear side, the carrier comprising a plurality of electrically conductive regions;
    a magnet for generating a magnetic field, the magnet having a first magnetic pole formed along a first surface and a symmetry axis extending substantially perpendicular to the first surface, the first magnetic pole being formed in a y-z plane and having a second magnetic pole spaced apart from the first magnetic pole in an x-direction, the axis of symmetry penetrating the first surface,
    wherein between the two regions of the plurality of electrically conductive regions and the at least two connection contacts of the semiconductor body there is in each case an electrical operative connection,
    wherein the first surface of the magnet is arranged substantially parallel to the z-direction, and the axis of symmetry of the magnet is substantially perpendicular to the z-direction,
    wherein the transducer has an end face facing the magnetic field sensor,
    wherein the end face of the transducer is moveable parallel to the z-direction, at least up to a measuring height in a direction of the magnetic field sensor,
    wherein the magnetic field sensor has a first distance, which is formed in the direction of the axis of symmetry, with respect to the first surface of the magnet,
    wherein the magnetic field sensor has a second distance to the measuring height, and
    wherein the first distance is between 60% and 160% of the second distance.

2. The measuring system according to claim 1, wherein the first distance is between 80% and 110% of the second distance.

3. The measuring system according to claim 1, wherein the magnet is formed cubically or cylindrically.

4. The measuring system according to claim 1, wherein the semiconductor body with the magnetic field sensor and the magnet are arranged on the front side of the carrier and wherein at least the magnetic field sensor is completely enclosed by an encapsulating material.

5. The measuring system according to claim 1, wherein the semiconductor body with the magnetic field sensor is formed as a packaged IC or a wired, packaged IC.

6. The measuring system according to claim 1, wherein the front side of the carrier is formed as a planar surface, and wherein the semiconductor body and the magnet are arranged adjacent to each other on the front side.

7. The measuring system according to claim 1, wherein the front side of the carrier has at least one recess, and wherein the magnet is arranged in the recess.

8. The measuring system according to claim 1, wherein the magnetic field sensor is a lateral Hall plate and has a main extension plane extending substantially parallel to the axis of symmetry of the magnet.

9. The measuring system according to claim 1, wherein the magnetic field sensor is a vertical Hall plate and has a main extension plane, the main extension plane extending substantially perpendicular to the axis of symmetry of the magnet.

10. The measuring system according to claim 1, wherein in addition to the semiconductor body with the magnetic field sensor, the carrier also accommodates the magnet, and wherein the magnet is arranged at least partially above the carrier.

11. The measuring system according to claim 1, wherein the axis of symmetry penetrates the magnetic field sensor and the first pole face of the magnet penetrates a center of gravity of the semiconductor body.

12. The measuring system according to claim 1, wherein a second pole face of the magnet is distanced from the first pole face in the x-direction, and the first pole face and the second pole face are formed substantially parallel to each other.

* * * * *